US011287116B2

(12) United States Patent
Jackson

(10) Patent No.: US 11,287,116 B2
(45) Date of Patent: Mar. 29, 2022

(54) HANGING SUPPORT BRACKET

(71) Applicant: Innovative Solutions Ltd., Wiggins, CO (US)

(72) Inventor: Dennis Jackson, Brighton, CO (US)

(73) Assignee: Innovative Solutions Ltd., Brighton, CO (US)

( * ) Notice: Subject to any disclaimer, the term of this patent is extended or adjusted under 35 U.S.C. 154(b) by 0 days.

(21) Appl. No.: 16/732,114

(22) Filed: Dec. 31, 2019

(65) Prior Publication Data

US 2021/0199272 A1 Jul. 1, 2021

(51) Int. Cl.
| F16M 13/00 | (2006.01) |
| F21V 21/08 | (2006.01) |
| F21S 8/08 | (2006.01) |
| F16M 13/02 | (2006.01) |
| F21W 131/10 | (2006.01) |
| F21V 21/10 | (2006.01) |

(52) U.S. Cl.
CPC ............ *F21V 21/08* (2013.01); *F16M 13/02* (2013.01); *F21S 8/08* (2013.01); *F16M 13/022* (2013.01); *F21V 21/10* (2013.01); *F21W 2131/1005* (2013.01)

(58) Field of Classification Search
CPC ............ F21V 21/08; F21S 8/08; F16M 13/02; F16M 13/022
See application file for complete search history.

(56) References Cited

U.S. PATENT DOCUMENTS

| 835,314 | A | * | 11/1906 | Oliver | F21V 21/08 248/214 |
| 2,687,836 | A | * | 8/1954 | Rhodes | B60R 7/10 224/556 |
| 4,418,496 | A | * | 12/1983 | Koistinen | A01G 5/04 248/215 |
| 4,880,133 | A | * | 11/1989 | Cullinane | A47G 7/044 220/737 |
| 5,236,162 | A | * | 8/1993 | Desjardins | A61M 5/1415 248/214 |
| 5,361,950 | A | * | 11/1994 | Signal | B60N 3/103 224/482 |
| 9,004,433 | B2 | * | 4/2015 | Krieger | B60N 3/102 248/311.2 |

* cited by examiner

*Primary Examiner* — Tan Le
(74) *Attorney, Agent, or Firm* — Polsinelli PC; Gregory P. Durbin

(57) ABSTRACT

Aspects of the present disclosure may involve a support bracket that can include a first portion, a second portion, and a third portion. The first portion may define a first width. The first width can be about the same dimension as a first flange width of a first type of I-beam. A clamp may be positioned within the first portion to fasten the support bracket to the first flange. The support bracket may include a second portion that may define a second width. The second width may be about the same dimension as a second flange width of a second type of I-beam. The clamp may be positioned within the second portion to fasten the support bracket to the second flange. A mounting platform may extend from the support bracket. The mounting platform may include a mounting member for securing a pole. The support bracket may include a hook where the support bracket may be hung from the first type of I-beam or the second type of I-beam.

17 Claims, 8 Drawing Sheets

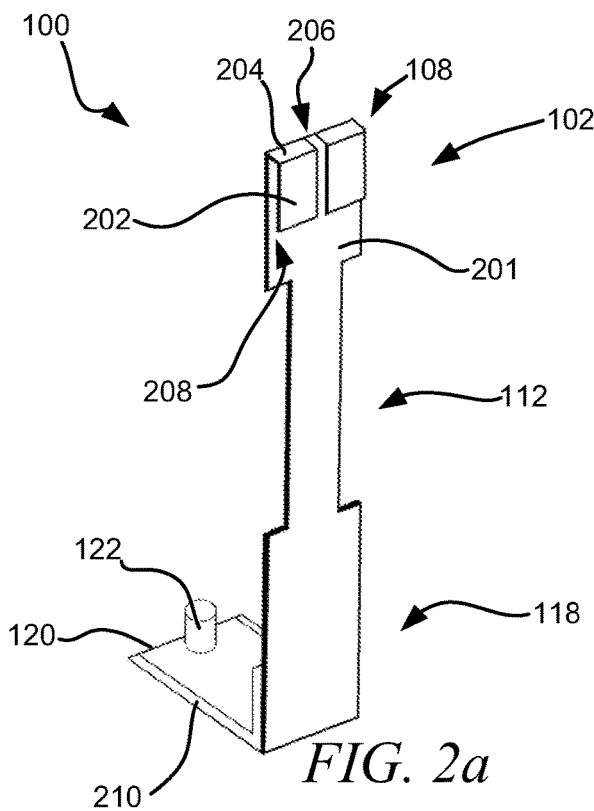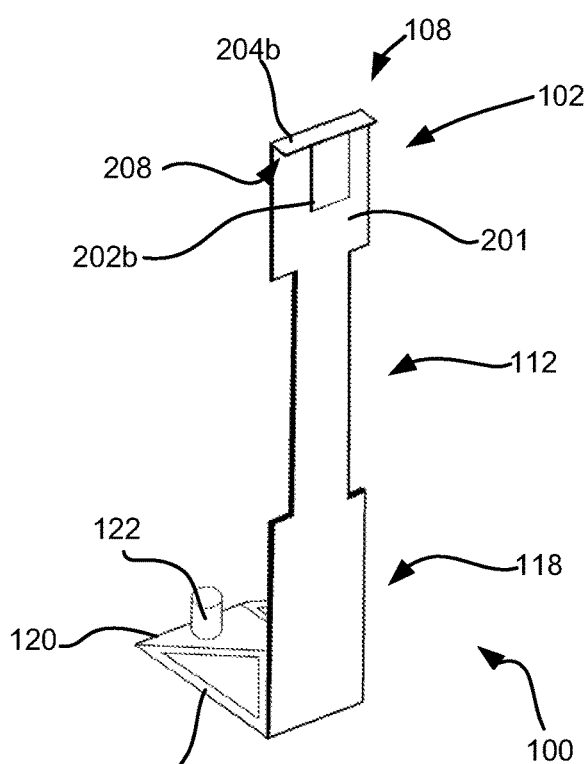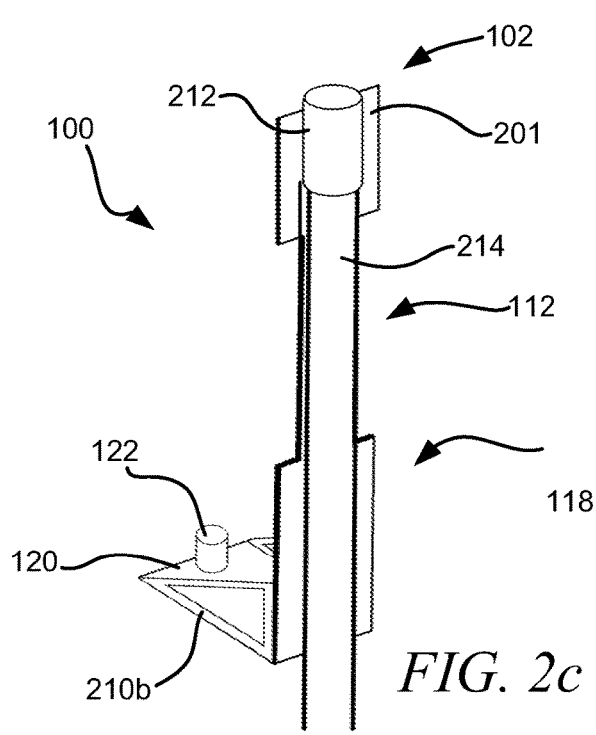
FIG. 2a
FIG. 2b
FIG. 2c

HANGING SUPPORT BRACKET

TECHNICAL FIELD

Aspects of the present disclosure involve a support apparatus and, more particularly, a support bracket apparatus for supporting poles, such as light poles, that can be hung from differently sized I-beams.

BACKGROUND

Worksites, such as drilling and construction sites, can operate around the clock and may require lights to illuminate the worksite during darker hours. To provide such illumination, large lighting rigs may be positioned around the site. These lighting rigs are often self-contained and include lights on tall telescoping poles mounted to large towable generators. As a result, such lighting rigs take up precious space that could be otherwise used for more operating room, to store items, and to otherwise make the worksite more efficient.

Finding adequate and convenient space for the lighting rigs can also pose challenges. Besides space challenges, lighting rigs often must each be turned on and off—one at a time. The generators are often loud, adding to the noise of an already noisy environment, and emit fumes within the confines of the site.

With these observations in mind, among others, aspects of the present disclosure were conceived and developed.

SUMMARY

Aspects of the present disclosure involve a bracket for supporting a lighting assembly on a variety of differently dimensioned support posts. In one example, a support bracket includes a first portion, a second portion, and a third portion. The first portion may define a first width. The first width can be about the same dimension as a first flange width (of a first flange) of a first type of I-beam. A clamp may be positioned within the first portion to fasten the support bracket to the first flange. The support bracket may include a second portion that may define a second width. The second width may be about the same dimension as a second flange width (of a second flange) of a second type of I-beam. The clamp may be positioned within the second portion to fasten the support bracket to the second flange. A mounting platform may extend from the support bracket. The mounting platform may include a mounting member for securing a pole to the mounting platform. The support bracket may include a hook where the support bracket may be hung from the first type of I-beam or the second type of I-beam.

In certain instances, the first portion may be positioned above the mounting platform and may extend parallel to the first type of I-beam or the second type of I-beam when hung from the first type of I-beam or the second type of I-beam, respectively. In certain instances, the first width may be about six inches.

In certain instances, the hook may include a horizontal portion and a vertical portion extending downwardly from the horizontal portion. In certain instances, the first portion may include the hook. In certain instances, the hook may include a cutout having a cutout width, the cutout width being greater than each of a thickness of a web of the first type of I-beam and a thickness of a web of the second type of I-beam.

In certain instances, the first portion may include an outward facing surface, and the horizontal portion may extend perpendicular to and away from the outward facing surface such that the outward facing surface and the vertical portion of the hook define a gap therebetween, the gap having a gap width greater than each of a thickness of the first flange and a thickness of the second flange. In certain instances, the vertical portion may extend vertically downward and perpendicular to the horizontal portion.

In certain instances, the second portion may be connected to the first portion, the second portion may be positioned below the first portion, and the second portion may be parallel to the first portion. In certain instances, the second width may be about four inches.

In certain instances, the mounting platform may be positioned below the first and second portions and may extend perpendicular to the first and second portions. In certain instances, the support bracket may include a third portion connected to the second portion, positioned below the first and second portions, and the mounting platform may extend from the third portion.

In certain instances, the mounting platform may include a gusset extending from the third portion to the mounting platform.

In certain instances, the mounting member may be a cylindrical receptacle for receiving the pole and may extend vertically upward from the mounting platform. In certain instances, the mounting member may be a column to receive a tubular portion of the pole.

In certain instances, the pole may be a pole for a lighting fixture. In certain instances, the lighting fixture may include a wiring harness.

In certain instances, the support bracket may include the clamp. In certain instances, the clamp may include a junction box coupled to the clamp, wherein the junction box may include a light control circuit. In certain instances, the light control circuit may include a GPS unit.

In certain instances, the support bracket may include a first portion defining a first width between opposing sidewalls, the first width being about the same dimension as a width of a support structure post. In certain instances, the mounting platform may extend from the support bracket and comprise a mounting member extending upward from the mounting platform. The mounting member may secure a light fixture to the mounting platform, wherein the light fixture includes a wiring harness operatively connected with a non-integral power unit, wherein the non-integral power unit provides power to at least one second light fixture. The support bracket may further include a feature where the support bracket may be hung from the support structure post.

In certain instances, the mounting platform may include a fastener for fastening the support bracket to the first type of I-beam or the second type of I-beam.

BRIEF DESCRIPTION OF THE FIGURES

FIGS. 2a-2c are rear isometric views of different embodiments of the support bracket of FIG. 1.

DETAILED DESCRIPTION

Figure 1:
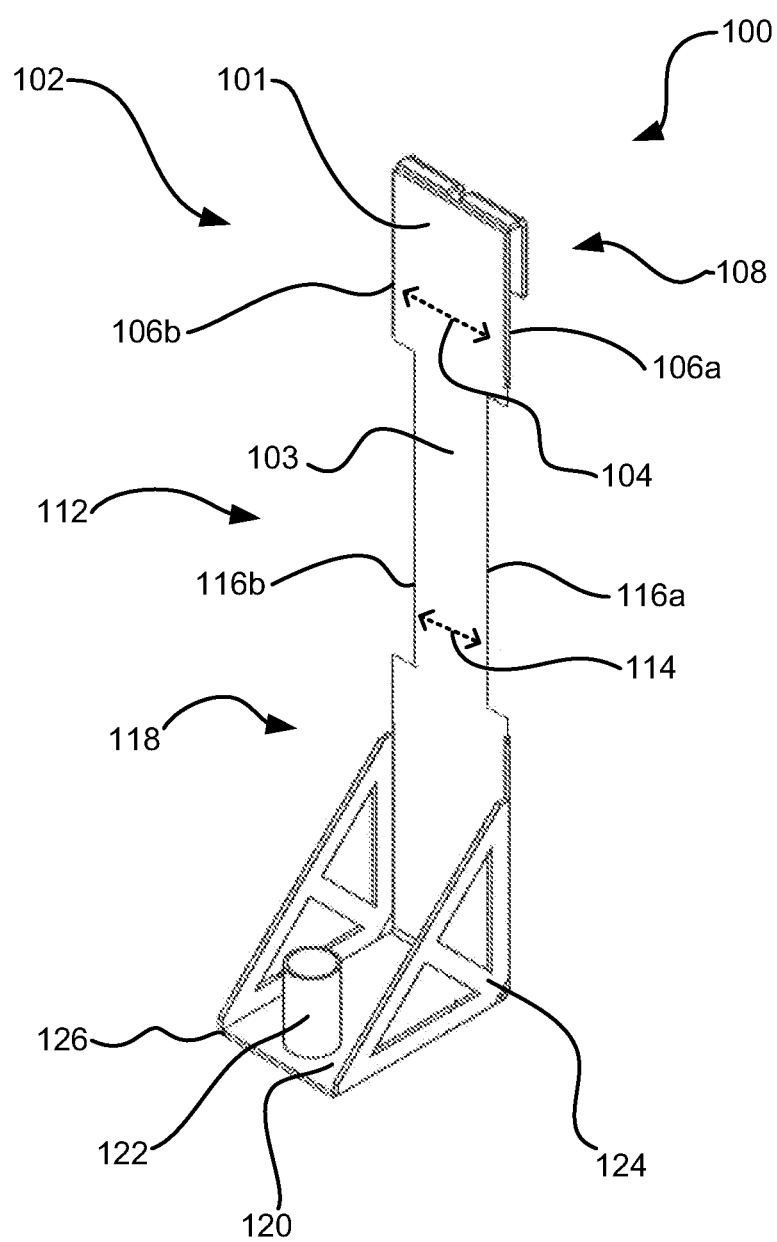
FIG. 1 is a front isometric view of a support bracket according to an implementation of the present disclosure.
Figure 3:
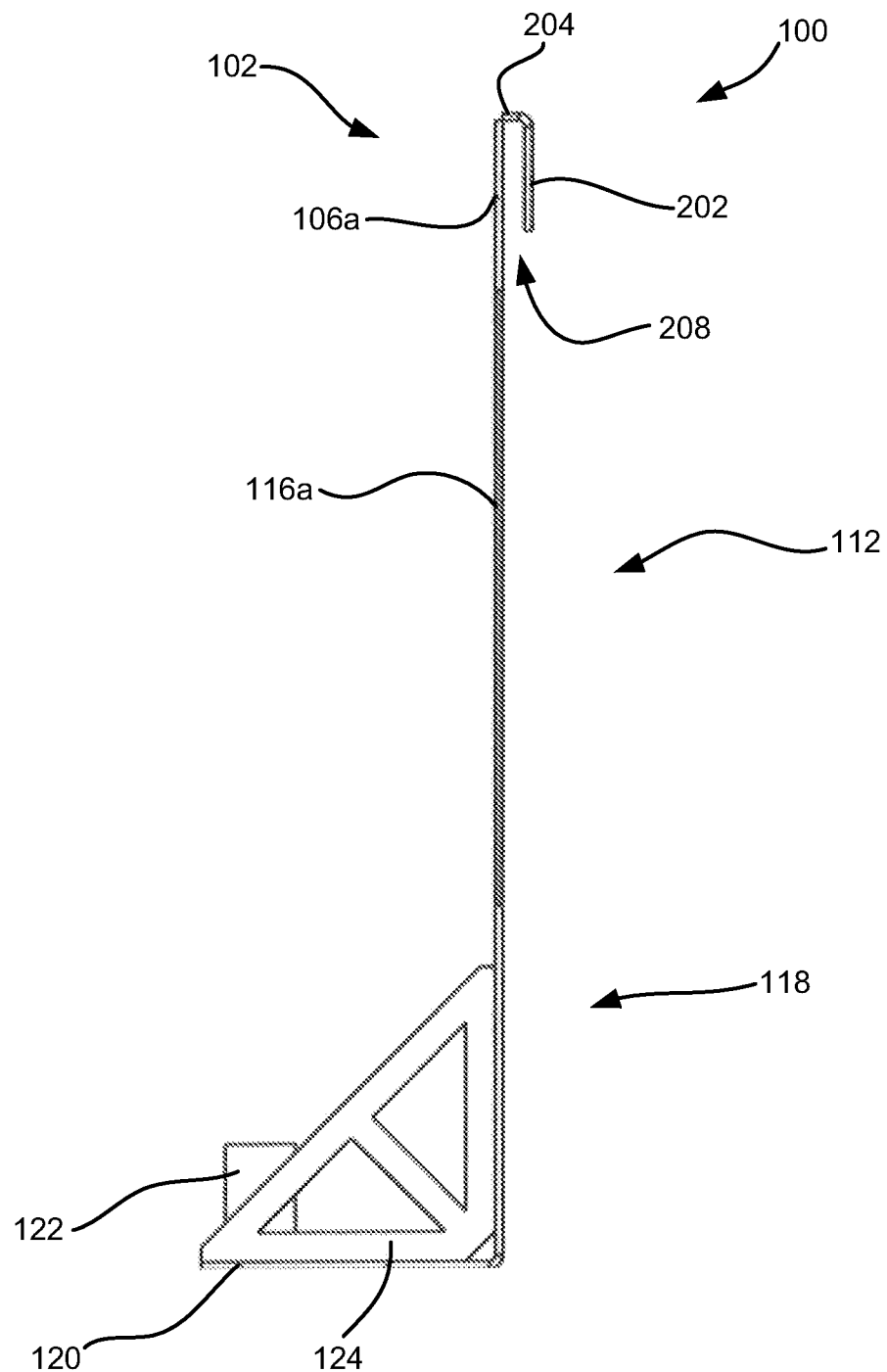
FIG. 3 is side view of the support bracket of FIG. 1.
Figure 4:
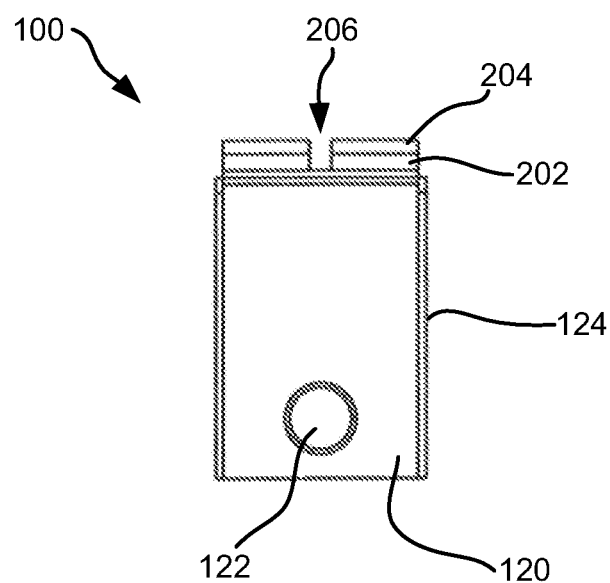
FIG. 4 is top view the support bracket of FIG. 1.

Aspects of the present disclosure involve a support bracket for mounting equipment, such as lights, to differently sized support structures. In many instances, various worksites, especially within populated areas, may be walled-in, and the walls may be supported with I-beams of different sizes. In one example, the support bracket is adapted to hang from such an I-beam and also dimensioned for being clamped to different sized I-beams so that one support bracket may work at sites with different sized I-beams and at sites that may have different sized I-beams within the site. The support bracket may include a first portion having a first width where a clamp may fasten the support bracket to a support structure post (e.g., I-beam) with a similar first width, and a second portion with a second width where the clamp may fasten the support bracket to a support structure post (e.g., different sized I-beam) with a similar second width, and a mounting platform to support a lighting rig. The bracket may be hung from the I-beam and also clamped to the I-beam regardless of I-beam size.

Previously, lights have been mounted to large towable generators to illuminate work areas during low light and dark hours. These lighting rigs can present various issues at the worksite because they are large and can take up space workers could use to better operate and perform their work. Moreover, and of particular importance in walled or otherwise confined spaces, conventional lighting rigs each produce noise and emissions, and many work sites need several such conventional lighting rigs for proper lighting. With the present disclosure, many light bracket assemblies may be driven from a non-integral power unit (e.g. a single generator) providing the light normally produced by an equal number of stand-alone lighting rigs, which provides the distinct advantages of materially reducing emissions at the worksite, materially reducing fuel consumption, materially reducing noise at the worksite, and materially reducing maintenance.

To address the foregoing issues, support brackets in accordance with the present disclosure are adapted to be hung from I-beams which may be disposed around the worksite to support structures, such as perimeter fences. By hanging the bracket from existing posts, the need for a telescoping pole or otherwise standing structure within the site is eliminated, freeing up valuable space. In one example, the support brackets are hung from I-beams using a hook that is attached to the support bracket and placed over the top of the vertically oriented I-beam. The hook, having a shape to accommodate an I-beam flange and web, is designed to suspend the support bracket from an outward facing flange of the vertically oriented I-beam. In this way, the support bracket utilizes commonly used existing worksite structures, such as I-beam supports for perimeter sound walls, instead of large towable generators.

Using the support bracket to hang the lights from the I-beams supporting perimeter fences can also provide more options for generator placement removing the loud, gas fume emitting generators from areas where people are working. The perimeter fences can provide support for electrical wiring away from possible contact, unlike cables running on the ground across the worksite. Moreover, a single generator can be used to power multiple lights which can provide worksites with more options to place a generator and use fewer generators overall than towable generator/light assemblies. The I-beam support structures are also very sturdy and provide a more stable base for the lights than the long telescoping poles mounted to the towable generators.

As mentioned, there are different sizes of I-beams, such as four-inch and six-inch I-beams (each of which refers to the flange width of the I-beam). Accordingly, to avoid having to inventory and manage multiple sizes of support brackets for each I-beam size, support brackets in accordance with the present disclosure are configured to fit on multiple sizes of I-beams, thereby simplifying inventory management, shipping, installation, part count, and numerous other advantages. Support brackets in accordance with the present disclosure include surfaces of varying widths where a fastener, such as a clamp, may be placed to fasten the support bracket to I-beams of similar varying widths. Light brackets that do not contain this feature accommodate single I-beams. Support brackets in accordance with the present disclosure reduce operator cost by accommodating more than one type of I-beam, thereby reducing inventory purchase and maintenance costs. Additionally, the support brackets of this disclosure reduce storage requirements because they can be fastened to more than one type of I-beam, replacing the plurality of brackets needed to accommodate one type of I-beam, further reducing operator costs by freeing up worksite and/or warehouse space.

Figure 5:
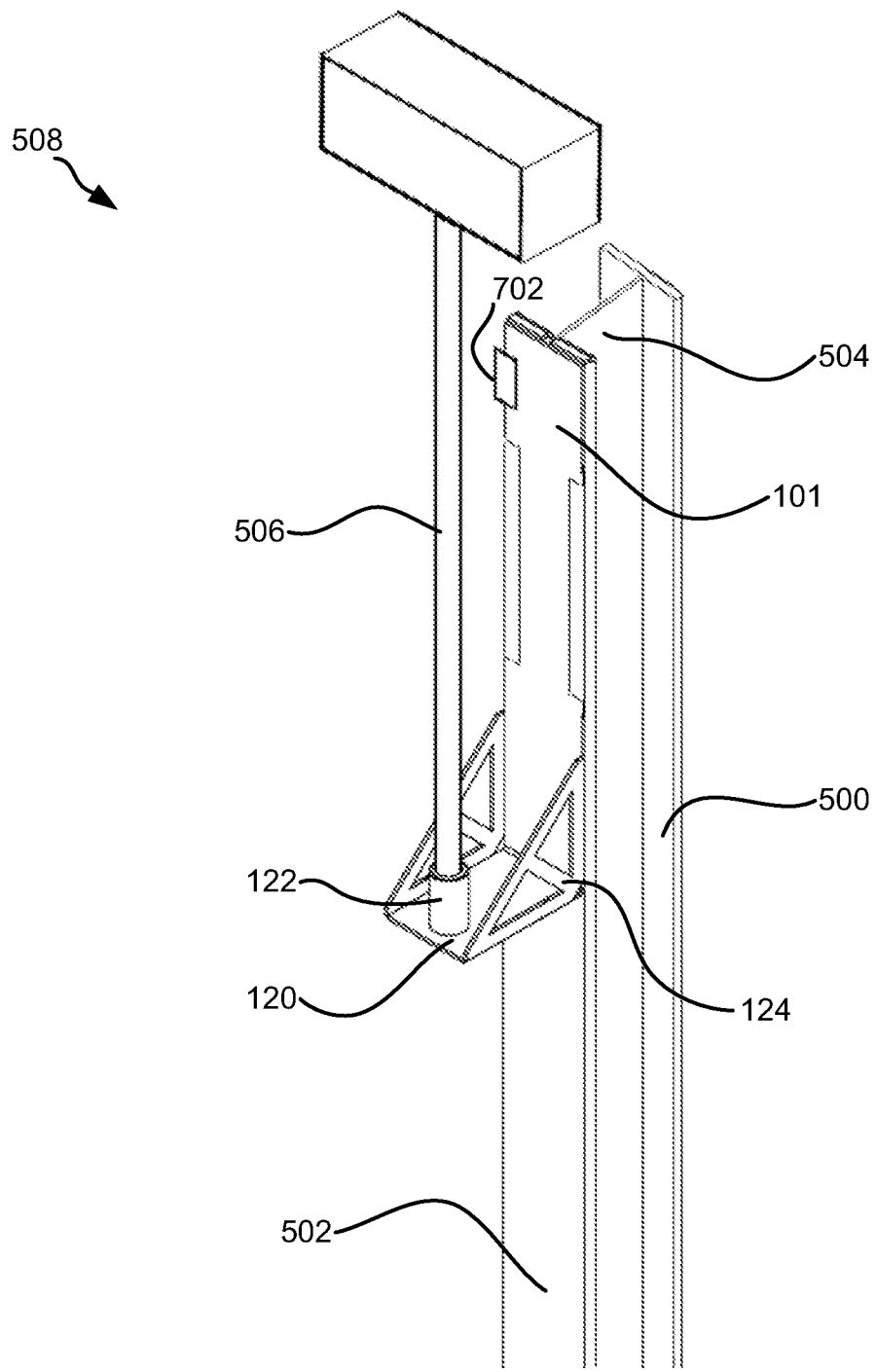
FIG. 5 is an isometric view of the support bracket of FIG. 1 installed on a first I-beam and supporting a light pole.

FIGS. 1-5 illustrate various views of a support bracket 100 according to one implementation of the present disclosure, with FIG. 5 being an isometric view of the support bracket 100 of FIG. 1, installed on a first I-beam 500 and supporting a light pole 506. FIGS. 2b and 2c depict alternatives to the hook 108 (as illustrated in FIG. 2a) for securing the support bracket 100 to a support post.

Figure 6:
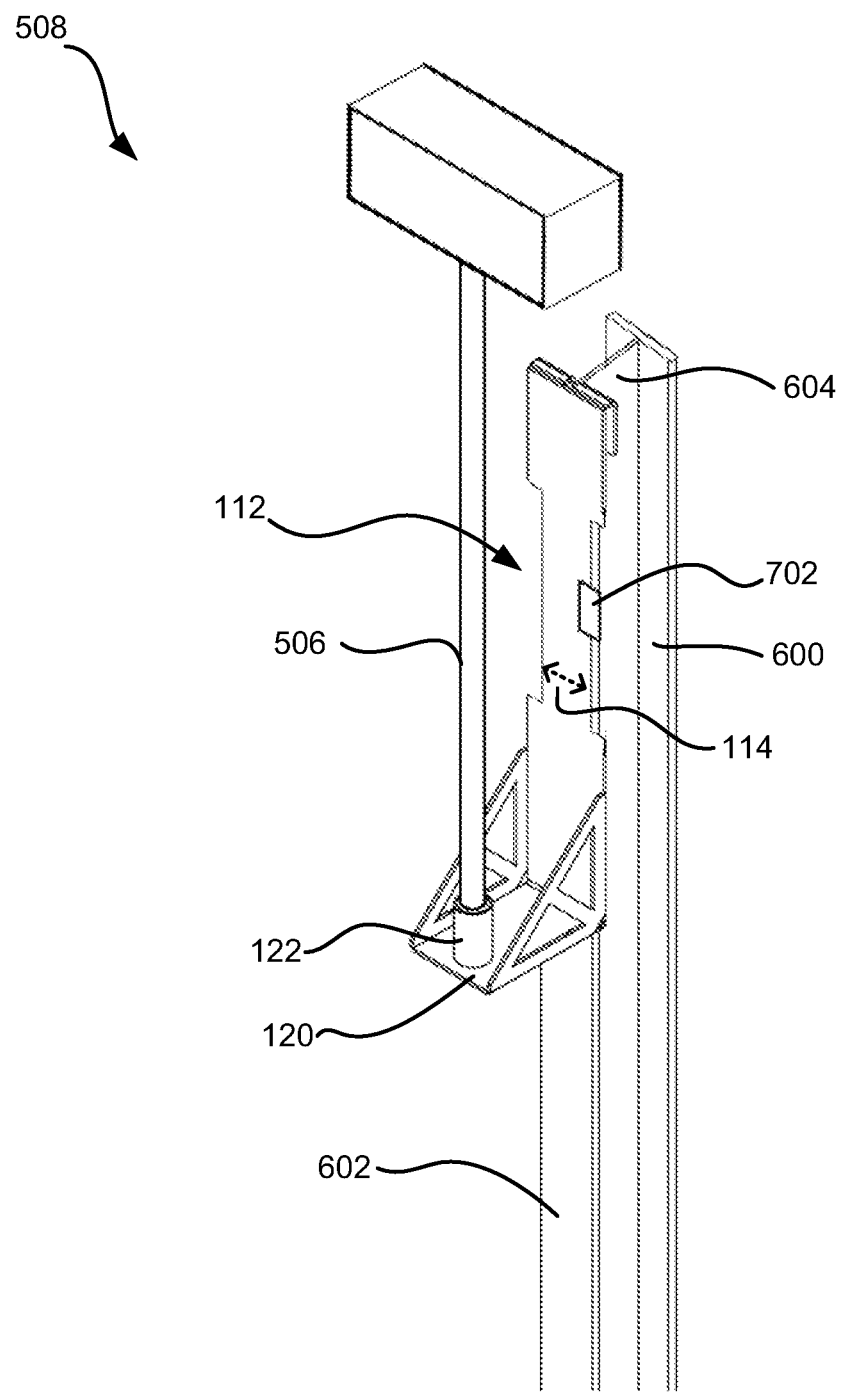
FIG. 6 is an isometric view of the support bracket of FIG. 1 installed on a second I-beam and supporting a light pole.

Referring first to FIG. 1, the support bracket 100 generally includes a first portion 102, a second portion 112, and a mounting platform 120. The first portion 102 includes a first outward facing surface 101 having a first width 104 defined between two opposing sidewalls 106a, 106b. The first outward facing surface 101 provides a first location where a clamp (such as clamp 702, shown in FIG. 6) may be placed to fasten the support bracket 100 to a first support structure, such as the flange 502 of the I-beam 500 (as illustrated in FIG. 5). Similarly, the second portion 112 includes a second outward facing surface 103 having a second width 114 defined between two opposing sidewalls 116a, 116b. The second outward facing surface 103 provides a second location where a clamp (such as clamp 702, shown in FIG. 6) may be placed to fasten the support bracket 100 to a second support structure, such as the flange 602 of the I-beam 600 (as illustrated in FIG. 6). The second portion 112 may connect to the first portion 102 and may be positioned below the first portion 102. The second portion 112 may extend vertically below and parallel to the first portion 102. While the wider (first width) area is shown above the narrower (second width) area, it is possible to reverse that relative orientation. Similarly, it is possible to have the area above the mounting platform be of one width and have an extension of the bracket below the mounting platform of a second width. For the area extending below the platform, it may also be possible to have a third width region (which may be similarly integrated in the bracket between the mounting platform and the hook). Hence, other relative orientations of the first width area and the second width area, and additional such areas, are possible.

For example and without limitation, in one specific implementation, the first width 104 may be about the width of the first flange 502 of the first type of I-beam 500 (as illustrated in FIG. 5). The first width 104 may be about six inches, a commonly used I-beam width, or any width that is suitable for the clamp 702 to fasten the support bracket 100 to an I-beam of similar width. The first width 104 and the width of the first flange 502 may be within a tolerance of +/−10%. The first width 104 and second width 114 may also be dimensioned to be about the same respective widths of the respective I-beams and within a tolerance such that a single clamp may work for clamping to either I-beam. In another example, the widths relative to the I-beam widths may be within engineering or fabrication tolerance ranges recognized by one skilled in the art. The second width 114 may be about the width of the second flange 602 of the second type of I-beam 600 (as illustrated in FIG. 6). The second width 114 may be about four inches, a commonly used I-beam width, or any width that is suitable for the clamp 702 to fasten the support bracket 100 to an I-beam of similar width. The second width 114 and the width of the second flange 602 may be within a tolerance of +/−10% or any other engineering or fabrication tolerance range recognized by one skilled in the art. The width of the first portion 102 and second portion 112 relative to the targeted width of the respective I-beams may also be within whatever tolerance will accommodate the size clamp that will be used to clamp the support bracket 100 to either the first type of I-beam 500 or the second type of I-beam 600, where a common sized clamp is used in both instances.

In certain implementations, the first portion 102 may include a hook 108 to hang the support bracket 100 from the support structure. For example and referring to FIG. 2a, the first portion 102 of the support bracket 100 may include a hook 108 to hang the support bracket 100 on the first flange 502 of the first type of I-beam 500 or the second flange 602 of the second type of I-beam 600 (as illustrated in FIG. 5 and FIG. 6, respectively). In the specific implementation illustrated in FIG. 2a, for instance, the hook 108 includes a horizontal portion 204 and a vertical portion 202. The horizontal portion 204 extends perpendicular to and away from the first outward facing surface 101 and the vertical portion 202 extends vertically downward and perpendicular to the horizontal portion 204, thereby defining an offset 208 between the vertical portion 202 and a back surface 201 of the first portion 102. To accommodate the first flange 502 or the second flange 602, the offset 208 may be greater than the thicknesses of each of the first flange 502 and the second flange 602. In certain implementations, the vertical section 202 length may extend a fraction, such as one half, of the length of the first portion 102. The hook 108 may also include a cutout 206 to allow the hook 108 to slide over the first flange 502 and second flange 602, accommodating space for the first I-beam web 504 or second I-beam web 604 (as illustrated in FIG. 5 and FIG. 6, respectively). To accommodate multiple sizes of I-beams, the cutout 206 may have a width that is greater than the web thickness of multiple sizes of I-beams. For example and without limitation, the cutout 206 may be half-an-inch, a thickness of a first type of I-beam web 504 and a second type of I-beam web 604. The hook 108 may hang from the I-beam by inserting the flange 502, 602 between the horizontal portion 204 and the vertical portion 202 and by inserting the I-beam web 504, 604 within the cutout 206. In another example, the hook 108 may not have a cutout 206 and may include a vertical portion 202b (as illustrated in FIG. 2b) that extends downward from the center of the hook's horizontal portion 204b. The illustrated hook may be formed of the same metal piece forming the support bracket. Alternatively, the hook may be some form of attached (e.g., welded, riveted, bolted) hook structure sufficient to hang the bracket from an I-beam or other post.

It is possible to include alternatives to the hook 108 for securing the support bracket 100. For example, to secure the support bracket 100 to a circular post 214, a capped tube 212 (e.g., pipe) may be welded to the first portion 102 of the support bracket 100 where the hook 108 is shown in FIG. 2a (as illustrated in FIG. 2c). The capped tube 212 is of sufficient diameter to fit over the post 214, and the capped tube 212 holds the support bracket 100 at the top of the post 214 where the cap engages the top of the post 214. In another alternative, a hook 108 that is dimensioned to fit into an open top post may be used. For a square or rectangular post, a sufficiently dimensioned tube may fit over the square or rectangular post. In such an embodiment, the alternative dimension bracket areas (104 and 114) may be dimensioned according to possibly different post dimensions, whether circular, square, or rectangular.

Referring back to FIG. 1, the mounting platform 120 extends from the support bracket 100. The support bracket 100 may include a third portion 118 immediately below the second portion 112 and may be the same width as the first portion 102, the second portion 112, or may be another width. In one example, the mounting platform 120 extends from the third portion 118. In various possible alternatives, the mounting platform 120 may extend from the second portion 112 (without a third portion), may extend from the second portion with a third portion extending below the mounting bracket, and the like.

The mounting platform 120 may be reinforced by one or more support members 124, such as an angle bracket 210 (as illustrated in FIG. 2a). The support members 124 may be positioned on the outside edges of the mounting platform 120 to the support bracket 100 to either side of a mounting member 122 extending up from the mounting platform 120, Alternatively, the support member or members may otherwise be secured between the support bracket 100 and mounting platform 120 sufficiently to reinforce the mounting platform 120 and support the weight and various forces on the support bracket 100 and mounting platform 120 from whatever light structure that is mounted in the mounting member 122.

In one specific implementation, the support member 124 is a gusset 210b positioned between the mounting platform 120 and the third portion 118 (as illustrated in FIG. 2b). The gusset 210b may be made of the same material as the support bracket 100, such as steel, or any suitable material for supporting the mounting platform 120. The gusset may be welded to the support bracket 100 and mounting platform 120 along edges of both.

The mounting platform 120 includes the mounting member 122 for securing a pole 506 (as illustrated in FIG. 5). In one example the mounting member secures the pole 506 by receiving the pole 506 into the mounting member 122, which is the same shape of the pole 506. Various other possible structures may be included to secure the pole to the mounting member. In another example, the mounting member 122 may secure the pole 506 by inserting the pole 506 over the mounting member 122 having a similar shape of the pole 506. The mounting member 122 may be a cylindrical shape or any other shape, such as a rectangular shape, suitable for securing whatever pole 506 is associated with a target light assembly supported by the bracket. Shown in FIG. 5, the mounting member 122 may be shaped to receive the pole 506 from a fixture such as a light fixture 508. The mounting member 122 extends vertically upward from the mounting platform 120 and extends parallel to the first portion 102. The mounting member 122 may be positioned at the farthest point from the third portion 118 in the mounting platform 120. In another example, the mounting member 122 may be positioned at another location suitable for receiving the pole 506, such as half the distance from the third portion 118 and the free-end 126 of the mounting platform 120. The pole 506 may be supported by the mounting platform 120 and the mounting member 122. In another example, the pole 506 may sit positioned at a height by another apparatus, such as a cotter pin, which prevents the pole 506 from sliding through the mounting platform 120.

The support bracket 100 may be fastened to the first flange 502 or second flange 602 by a fastener, such as clamp 702 (as shown in FIG. 5 and FIG. 6, respectively). The clamp 702 may fasten the support bracket 100 to the first type of I-beam 500 or second type of I-beam 600 from any suitable position inside the first portion 102, second portion 112, or third portion 118.

Figure 7:
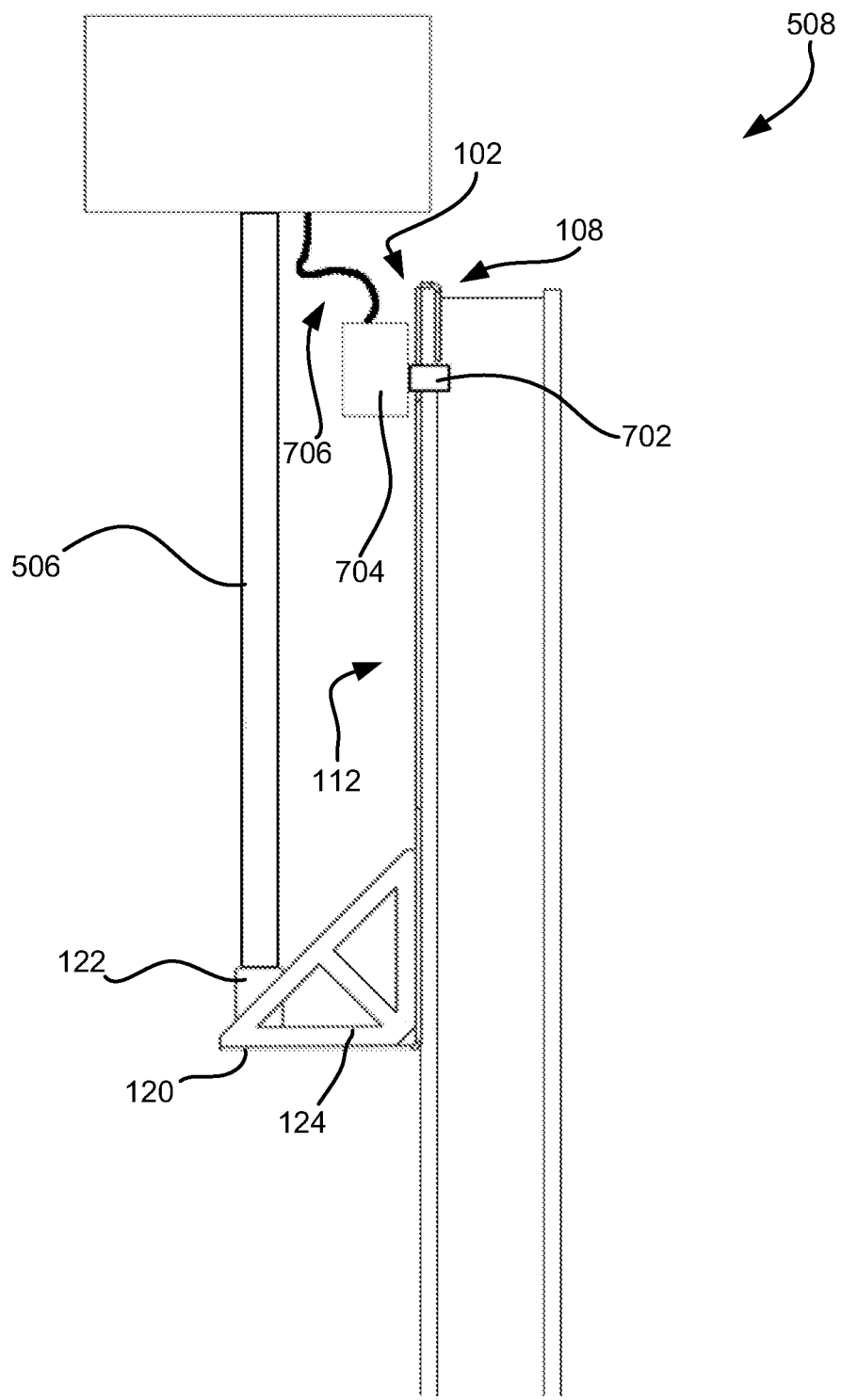
FIG. 7 is a side view of the support bracket of FIG. 1 installed on a first I-beam and supporting a light pole.
Figure 8:
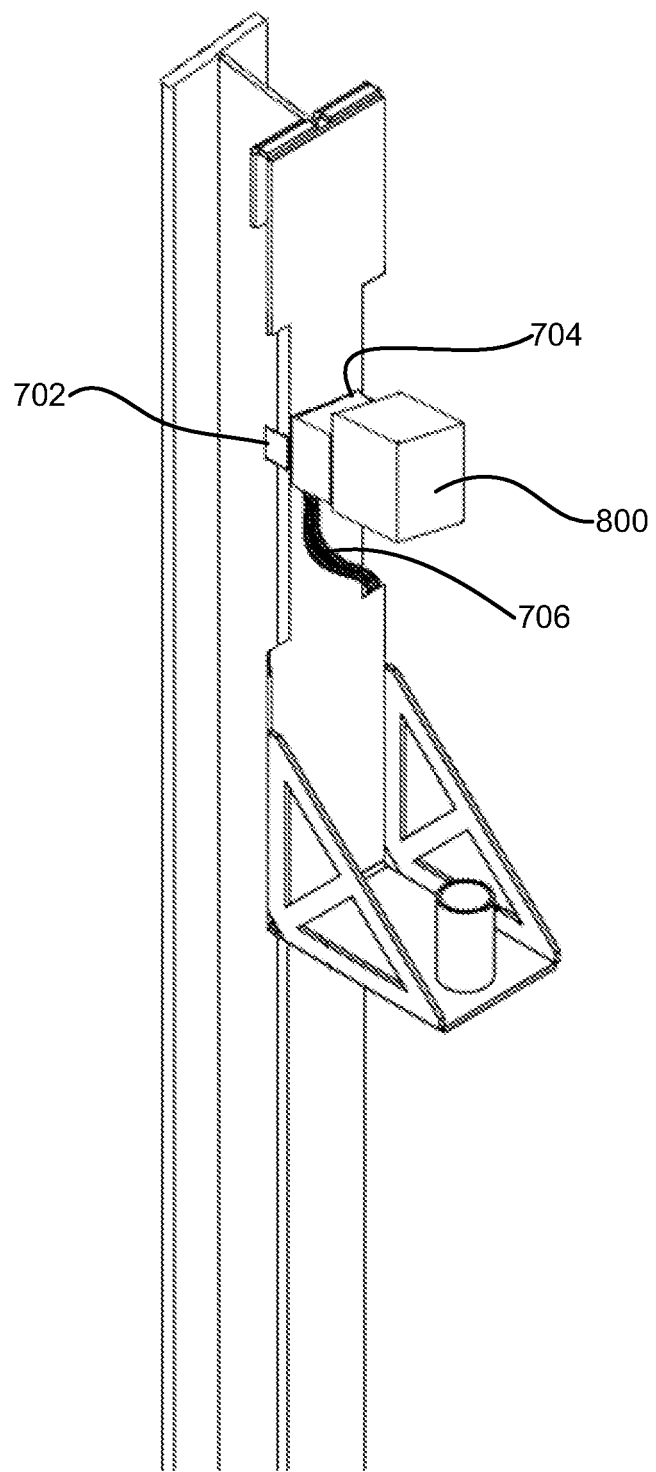
FIG. 8 is a photograph of a support bracket according to the present disclosure coupled to an I-beam using a clamp including a junction box.

Referring to FIG. 7, the clamp 702 may include an integrally attached junction box 704. In one example, the junction box can house wires such as a wiring harness 706. The wiring harness 706 may be operably connected to a non-integral power unit. The wiring harness 706 may provide electricity to the fixture supported by the mounting platform 120 such as the light fixture 508. The junction box 704 may be metal or any other suitable material, such as plastic, and may be fastened to the clamp 702 with any type of suitable fastener such as a bolt and a nut. The junction box 704 may include a light control circuit 800 which may include a timing circuit such as a Global Positioning System (GPS) unit. In one specific example, the light control circuit 800 would include electronic switches that are configured to switch electricity flowing to the light fixture 508 based on a timing schedule. Additionally, the light control circuit 800 is configured to use GPS timing to supply the timing schedule with location, date, and time information to automatically control the switches and the flow of electricity in the junction box 704 to the light fixture 508. In various possible alternatives, the light control circuit 800 may use any other timing circuit, switches, or control method to switch the electricity within the junction box 704. The junction box 704 may include a socket to which a plug from a non-integral power unit, such as a generator or battery, may be connected to supply the electricity. The socket may also receive a plug from the light fixture 508.

Although several specific embodiments of the disclosure have been described herein, those skilled in the art could make changes to the disclosed embodiments without varying or departing from the scope of the disclosure. Any directional references included in the description are only meant to aid the reader's understanding of the disclosure and are not limitations on the disclosure unless described as such. Furthermore, any joints or connections are meant to be construed broadly and may include intermediate members between a connection of elements and relative movement between elements.

Although the present disclosure has been described with reference to various specific embodiments, it will be understood that these embodiments are illustrative examples and that the scope of this disclosure is not limited to them. Many possible variations, modifications, improvements, alterations, and additions to the present disclosure are possible. These variations, modifications, improvements, alterations, and additions may fall within the scope of this disclosure as defined in the claims that follow. It is intended that everything contained in the description or drawings shall be interpreted as illustrative only and not limiting. Changes in detail or structure may be made without departing from the disclosure as defined in the claims which follow.

The invention claimed is:

1. An apparatus comprising:
    a support bracket including a first portion defining a first width between opposing sidewalls, the first width corresponding to a first width of a first flange of a first type of I-beam, the first portion adapted to fasten the support bracket to the first flange of the first type of I-beam;
    the support bracket further including a second portion defining a second width between opposing sidewalls, the second width corresponding to a second width of a second flange of a second type of I-beam, the second portion adapted to fasten the support bracket to the second flange of the second type of I-beam;
    a mounting platform extending from the support bracket, the mounting platform comprising a mounting member extending from the mounting platform and configured to receive a pole extending from the mounting member;
    the support bracket further including a hook adapted to hang the support bracket from the first type of I-beam or the second type of I-beam; and
    a junction box coupled to a clamp comprising a light control circuit including a GPS unit to provide location information to assist in managing inventory.

2. The apparatus of claim 1, wherein the first portion is positioned above the mounting platform and extends parallel to the first type of I-beam or the second type of I-beam when hung from the first type of I-beam or the second type of I-beam, respectively.

3. The apparatus of claim 1, wherein the first width is about six inches.

4. The apparatus of claim 1, wherein the hook comprises a horizontal portion and a vertical portion extending downwardly from the horizontal portion.

5. The apparatus of claim 4, wherein the first portion includes the hook.

6. The apparatus of claim 5, wherein the first portion comprises an outward facing surface and the horizontal portion extends perpendicular to and away from the outward facing surface such that the outward facing surface and the vertical portion of the hook define a gap therebetween, the gap having a gap width greater than each of a thickness of the first flange and a thickness of the second flange.

7. The apparatus of claim 4, wherein the vertical portion extends vertically downward and perpendicular to the horizontal portion.

8. The apparatus of claim 1, wherein the hook further comprises a cutout having a cutout width, the cutout width being greater than each of a thickness of a web of the first type of I-beam and a thickness of a web of the second type of I-beam.

9. The apparatus of claim 1, wherein the second portion is connected to the first portion, the second portion is positioned below the first portion, and the second portion is parallel to the first portion.

10. The apparatus of claim 1, wherein the second width is about four inches.

11. The apparatus of claim 1, wherein the mounting platform is positioned below the first and second portions and extends perpendicular to the first and second portions.

12. The apparatus of claim 1, wherein the support bracket further comprises a third portion connected to the second portion, positioned below the first and second portions, and the mounting platform extends from the third portion.

13. The apparatus of claim 12, wherein the mounting platform further comprises a gusset extending from the third portion to the mounting platform.

14. The apparatus of claim 1, wherein the mounting member comprises a receptacle for receiving the pole or a column to receive a tubular portion of the pole.

15. The apparatus of claim 1, wherein the pole is a pole for a lighting fixture.

16. An apparatus comprising:
- a support bracket including a first portion defining a first width between opposing sidewalls, the first width corresponding to a width of a support structure post;
- a mounting platform extending from the support bracket, the mounting platform comprising a mounting member extending upward from the mounting platform, where the mounting member secures a light fixture to the mounting platform, wherein the light fixture comprises a wiring harness operatively connected with a non-integral power unit, providing power to at least one second light fixture;
- the support bracket further including a feature adapted to hang the support bracket from the support structure post; and
- a junction box coupled to a clamp comprising a light control circuit including a GPS unit to provide location information to assist in managing inventory.

17. An apparatus comprising:
- a support bracket including a first portion defining a first width between opposing sidewalls, the first width corresponding to a first width of a first flange of a first type of I-beam, the first portion adapted to fasten the support bracket to the first flange of the first type of I-beam;
- the support bracket further including a second portion defining a second width between opposing sidewalls, the second width corresponding to a second width of a second flange of a second type of I-beam, the second portion adapted to fasten the support bracket to the second flange of the second type of I-beam;
- a mounting platform extending from the support bracket, the mounting platform comprising a mounting member extending from the mounting platform;
- a light fixture secured to the mounting platform, and comprising a wiring harness operatively connected with a non-integral power unit providing power to at least one second light fixture;
- the support bracket further including a hook adapted to hang the support bracket from the first type of I-beam or the second type of I-beam; and
- a junction box coupled to a clamp comprising a light control circuit including a GPS unit to provide location information to assist in managing inventory.

* * * * *